United States Patent
Schroetz et al.

(10) Patent No.: US 10,160,826 B2
(45) Date of Patent: Dec. 25, 2018

(54) HARDENERS FOR COLD-CURING EPOXY SYSTEMS

(71) Applicant: DOW Global Technologies LLC, Midland, MI (US)

(72) Inventors: Markus Schroetz, Baltringen (DE); Ludwig Huelskaemper, Attenweiler (DE); Marcus Pfarherr, Baltringen (DE); Sabine Dobler, Hochdorf (DE); Carmen Wiedmann, Laupheim (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/763,951

(22) PCT Filed: Mar. 5, 2014

(86) PCT No.: PCT/US2014/020758
§ 371 (c)(1),
(2) Date: Jul. 28, 2015

(87) PCT Pub. No.: WO2014/149763
PCT Pub. Date: Sep. 25, 2014

(65) Prior Publication Data
US 2016/0053046 A1    Feb. 25, 2016

Related U.S. Application Data

(60) Provisional application No. 61/798,703, filed on Mar. 15, 2013.

(51) Int. Cl.
| | |
|---|---|
| *C08G 59/50* | (2006.01) |
| *C09D 5/00* | (2006.01) |
| *C09D 163/00* | (2006.01) |
| *C08L 63/00* | (2006.01) |
| *C08G 59/18* | (2006.01) |
| *C09D 163/04* | (2006.01) |
| *B32B 27/26* | (2006.01) |
| *B32B 27/38* | (2006.01) |

(52) U.S. Cl.
CPC ......... *C08G 59/184* (2013.01); *C09D 163/00* (2013.01); *C09D 163/04* (2013.01)

(58) Field of Classification Search
None
See application file for complete search history.

(56) References Cited

U.S. PATENT DOCUMENTS

| | | | | |
|---|---|---|---|---|
| 4,197,389 A | * | 4/1980 | Becker | C08G 59/184 428/413 |
| 5,034,279 A | * | 7/1991 | Wilson, Jr. | C08G 59/10 204/501 |
| 5,034,495 A | | 7/1991 | Hansen et al. | |
| 5,246,984 A | * | 9/1993 | Darwen | C08G 59/184 523/404 |
| 5,489,630 A | * | 2/1996 | Walker | C08G 59/184 523/404 |
| 5,508,324 A | * | 4/1996 | Cook | C08G 59/184 523/404 |
| 5,527,839 A | * | 6/1996 | Walker | C08G 59/184 523/404 |
| 5,567,748 A | * | 10/1996 | Klein | C08G 59/18 428/413 |
| 5,854,312 A | | 12/1998 | Klippstein | |
| 6,136,894 A | * | 10/2000 | Stark | C08G 59/184 523/404 |
| 6,160,040 A | | 12/2000 | Ghosh | |
| 6,277,928 B1 | * | 8/2001 | Stark | C08G 59/184 523/404 |
| 6,410,658 B1 | | 6/2002 | Schrotz et al. | |
| 2007/0073009 A1 | | 3/2007 | Sabbadini et al. | |
| 2011/0313081 A1 | | 12/2011 | Schroetz | |
| 2012/0238710 A1 | | 9/2012 | Schroetz et al. | |
| 2012/0259040 A1 | * | 10/2012 | Schroetz | C08G 59/184 523/400 |
| 2014/0256852 A1 | * | 9/2014 | Vandezande | C08K 5/13 523/400 |

FOREIGN PATENT DOCUMENTS

| | | | |
|---|---|---|---|
| CN | 101649041 A | 2/2010 | |
| CN | 101885832 A | 11/2010 | |
| CN | 102030900 A | 4/2011 | |
| DE | 19848113 A1 * | 4/2000 | ............. C08G 59/14 |
| EP | 0000605 A1 * | 2/1979 | ........... C08G 59/184 |
| EP | 995767 A2 | 4/2000 | |

OTHER PUBLICATIONS

Machine translation of DE 19848113 A1 (no date).*
PCT/US2014/020758, International Search Report & Written Opinion dated Sep. 18, 2014.
Zhou, J. et al. "Synthesis of Nonionic Type Self-emulsified Waterborne Epoxy Curing Agent and its Properties", College of Chemical and Energy Engineering, 2006, vol. 20, No. 1, pp. 94-99.
Tao, Yong-Zhong et al. "Synthesis and Property of Type I Waterbone Epoxy Curing Agent and Its Coating"; Journal of Building Materials; 2000; Issue: 4; Abstract Only.

* cited by examiner

*Primary Examiner* — Michael J Feely
(74) *Attorney, Agent, or Firm* — Karl E. Stauss; Cantor Colburn LLP

(57) ABSTRACT

A hardener composition comprising: a) an isolated adduct comprising a reaction product of i) a polymer with a functionality of at least three, wherein said polymer contains at least one epoxy group; and ii) an amine wherein the isolated adduct is present as an aqueous solution; and b) a capping agent. This hardener can be used with a liquid epoxy resin to form a curable composition.

12 Claims, No Drawings

HARDENERS FOR COLD-CURING EPOXY SYSTEMS

BACKGROUND OF THE INVENTION

Introduction

Amine-containing hardeners are useful for epoxy resin applications. One type of amine hardener is a waterborne hardener. Water is an ideal "solvent" as it is non-flammable, non-VOC, non-toxic, and non-odorous. Waterborne hardeners exhibit easy workability, low sensitivity to wet substrates, good drying, excellent adhesion to most substrates, very good intercoat adhesion, and good corrosion protection on steel. Waterborne hardeners can be categorized into: polyaminoamides, amine/epoxy adducts with "free" monomeric amines, and amine/epoxy adducts without free amines. Waterborne hardeners are often made from polymeric starting materials. Waterborne hardeners are used where a very low viscous epoxy resin/hardener combination must be achieved without using solvents or any other volatile organic compounds (VOCs). In principle, water can be used with both components as an aqueous epoxy resin or an aqueous hardener. The preferred technical solution is to introduce self-emulsifiable groups via chemical reaction into the hardener. The water will evaporate upon film formation and curing. In non-aqueous systems, high boiling VOCs such as benzyl alcohol are used in the formulation. They act as plasticizers and can lower the glass transition temperature (Tg) of a formulation.

The groups introduced into the hardener which provide the self-emulsifiability are often of polyalkyleneoxide type (EO/PO/BuO). They provide a little flexibility but not as much as using a plasticizer like benzyl alcohol. One drawback to these hardeners is that upon curing, they form a three dimensional network with epoxy resins that are not flexible. Other hardeners that are able to reduce the three dimensional density normally have bad chemical resistance.

Therefore, a need remains for waterborne, amine-containing hardener compounds that have flexibility upon curing without having a density too high and also having good chemical resistance, and that also provide self-emulsifiability and flexibility without use of a plasticizer.

SUMMARY OF THE INVENTION

In one broad embodiment of the invention, there is disclosed a hardener composition comprising, consisting of, or consisting essentially of: a) an isolated adduct comprising a reaction product of i) a polymer with a functionality of at least three, wherein said polymer contains at least one epoxy group; and ii) an amine, wherein the isolated adduct is present as an aqueous solution; and b) a capping agent.

DETAILED DESCRIPTION OF THE INVENTION

Isolated Adduct

In an embodiment, one component of the composition is an isolated adduct comprising a reaction product of a polymer and an amine.

The polymer is the product of a polyfunctional aliphatic or aromatic alcohol reacted with alkyleneoxide (ethyleneoxide, propylene oxide, butylene oxide) to an extent that every OH-group is at least alkoxylated three times. End OH-groups are terminated by glycidyl groups by reaction with epichlorohydrin and subsequent dehydrohalogenation.

Examples of the polymer generally include polymer particles comprising an epoxy compound having at least one epoxy group and an average functionality of at least 1.8. The polymer can have a functionality in the range of from 1.8 to 3.8 in another embodiment, a functionality in the range of from 2.2 to 3.2 in yet another embodiment, and a functionality in the range of from 2.3 to 3.0 in yet another embodiment. Examples of the polymer include, but are not limited to Polypox™ VE 101592, D.E.R.™ 732, and D.E.R.™ 736.

Examples of the amine include but are not limited to aliphatic polyamines, arylaliphatic polyamines, cycloaliphatic polyamines, aromatic polyamines, heterocyclic polyamines, polyalkoxypolyamines, and combinations thereof. The alkoxy group of the polyalkoxypolyamines is an oxyethylene, oxypropylene, oxy-1,2-butylene, oxy-1,4-butylene or a co-polymer thereof.

Examples of aliphatic polyamines include, but are not limited to ethylenediamine (EDA), diethylenetriamine (DETA), triethylenetetramine (TETA), trimethyl hexane diamine (TMDA), hexamethylenediamine (HMDA), N-(2-aminoethyl)-1,3-propanediamine (N3-Amine), N,N'-1,2-ethanediylbis-1,3-propanediamine (N4-amine), methylpentamethylenediamine, and dipropylenetriamine. Examples of arylaliphatic polyamines include, but are not limited to m-xylylenediamine (mXDA), and p-xylylenediamine. Examples of cycloaliphatic polyamines include, but are not limited to 1,3-bisaminocyclohexylamine (1,3-BAC), isophorone diamine (IPDA), and 4,4'-methylenebiscyclohexanamine. Examples of aromatic polyamines include, but are not limited to m-phenylenediamine, diaminodiphenylmethane (DDM), and diaminodiphenylsulfone (DDS). Examples of heterocyclic polyamines include, but are not limited to N-aminoethylpiperazine (NAEP), and 3,9-bis(3-aminopropyl) 2,4,8,10-tetraoxaspiro(5,5)undecane. Examples of polyalkoxypolyamines where the alkoxy group is an oxyethylene, oxypropylene, oxy-1,2-butylene, oxy-1,4-butylene or a co-polymer thereof include, but are not limited to 4,7-dioxadecane-1,10-diamine, 1-propanamine,2,1-ethanediyloxy))bis(diaminopropylated diethylene glycol) (ANCAMINE® 1922A); poly(oxy(methyl-1,2-ethanediyl)), alpha-(2-aminomethylethyl)omega-(2-aminomethylethoxy) (JEFFAMINE® D-230, D-400); triethyleneglycoldiamine and oligomers (JEFFAMINE® XTJ-504, JEFFAMINE® XTJ-512), poly(oxy(methyl-1,2-ethanediyl)),alpha,alpha'-(oxydi-2,1-ethanediyl)bis(omega-(aminomethylethoxy)) (JEFFAMINE® XTJ-511); bis(3-aminopropyl)polytetrahydrofuran 350; bis(3-aminopropyl)polytetrahydrofuran 750; poly(oxy(methyl-1,2-ethanediyl)), a-hydro-w-(2-aminomethylethoxy) ether with 2-ethyl-2-(hydroxymethyl)-1,3-propanediol (JEFFAMINE® T-403), and diaminopropyl dipropylene glycol.

In an embodiment, the hardener is present as an aqueous solution. The epoxy component can react with amines, wherein every epoxy group in the molecule will react with 1 molecule of amine. To avoid polymerization, a molar excess of amine is used during the reaction, e.g. 1 epoxy group with 1.3 to 3 moles of amine. The excess of 0.3 to 2 moles must be removed as they will affect the properties of the hardener adversely. Removal is generally done by distillation. The residue is an isolated polymeric amine adduct. The polymer accounts for 30 weight percent to 95 weight percent of the isolated adduct, and the polyamine accounts for 5 weight percent to 70 weight percent of the isolated adduct.

In an embodiment, the isolated adduct is present in the composition in the range of from 5 weight percent to 95 weight percent, based on the total weight of the composition.

The isolated adduct is present in the range of from 10 weight percent to 80 weight percent in another embodiment, and is present in an amount in the range of from 20 weight percent to 70 weight percent in yet another embodiment.

Capping Agent

In an embodiment, the composition can contain a capping agent.

Examples of the capping agent include but are not limited to ethylene oxide, propylene oxide, butylene oxide, phenyl glycidyl ether, cresyl glycidyl ether, p.t-butylphenyl glycidyl ether, C12/C14 fatty alcohol glycidyl ether, and formaldehyde.

The capping agent is generally present in an amount in the range of 0.1 weight percent to 10 weight percent, based on the total weight of the hardener composition. In an embodiment, the capping agent can be present in a range of from 0.2 weight percent to 8 weight percent, based on the total weight of the hardener composition, and from 0.5 weight percent to 5 weight percent, based on the total weight of the hardener composition in yet another embodiment.

Modifier

The hardener composition may also include a modifier. The modifier is useful for dilution and may accelerate the curing speed in combination with epoxy resins. The modifier can also enhance surface appearance. Acids can be used as modifiers to adjust water solubility.

Examples of modifiers include, but are not limited to, benzyl alcohol, acids such as aceticpropionic or lactic acid, and also medium chain organic diacids, such as sebacic or azelaic acid, or amidosulphonic acid, citric acid, high boiling solvents, such as alkyleneglycol ethers, or esters.

The modifier is generally present in a range of from 0.05 weight percent to 5 weight percent, based on the total weight of the composition.

External Emulsifiers

The composition can also contain external emulsifiers. These can include, but are not limited to alkoxylated fatty alcohols or phenols. The external emulsifier is generally present in the hardener composition in the range of from 0.05 weight percent to 5 weight percent.

Process for Producing the Hardener

The hardener is generally prepared by the following process: epoxy is added to a molar excess of amine at a temperature of from 60° C. to 140° C. The excess is then distilled, at which point a capping agent is added at a temperature of from 60° to 140° C. Water is then added at a temperature of less than 100° C., after which an modifier and/or external emulsifier can be added.

In some embodiments (e.g. for self leveling flooring), the hardener formulation can be produced by mixing defoamers, pigments, fillers and thixotropic agents with a dissolver.

Curable Composition Product

In an embodiment, a curable composition comprises, consists of, of consists essentially of: I) the above-described hardener and II) an epoxy resin.

In an embodiment, the epoxy resin is a liquid epoxy resin. Examples of liquid epoxy resins that can be used include, but are not limited to bisphenol-A diglycidyl ethers (BADGE), bisphenol-F diglycidyl ethers (BFDGE), and epoxy novolacs. In another embodiment, the epoxy resin can be a solid bisphenol A epoxy resin.

The curable composition is produced by mixing the above hardener formulation with water and liquid epoxy resin to form an emulsion.

The curable composition can be optionally diluted with reactive diluents such as, for example, cresyl glycidyl ether (CGE), p.tert butyl-phenyl glycidyl ether (ptBPGE), C12/C14 glycidyl ether, butanediol diglycidyl ether (BDDGE), hexanediol-diglycidyl ether (HDDGE), and versatic acid glycidyl ester.

In an embodiment, the hardener component and the epoxy resin are mixed according to the hardener equivalent weight (HEW) and epoxide equivalent weight (EEW). The equivalents can generally be varied between 0.8 and 1.2 equivalents of epoxy to 1 equivalent amine hydrogen. In an embodiment, 1 equivalent of epoxy reacts with 1 equivalent amine hydrogen. The composition is then cured at ambient temperature.

These compositions are generally used as coatings, concrete primers, floorings, flexible mortars, repair systems for concrete, and also for other ambient or post cured curing applications.

EXAMPLES

Example 1—Preparation of Hardener

A four-necked glass flask with a mechanical stirrer and a thermometer was charged with 158 g (1 mol) TETA. With a dropping funnel 228.1 grams (0.5 equiv.) of Polypox™ VE 101592 was added at 70° C.

After the addition, vacuum was adjusted to 20 mbar and the batch was heated to 225° C. to distill the excess of TETA. The final pressure was 10 mbar. A 82.27 gram quantity (0.52 mol) of TETA was distilled. After cooling at a temperature below 100° C., 130.2 grams of water was added in one portion. A 27.2 gram quantity (0.1184 mol) of Polypox™ R7 was then added drop wise at 60° C. After 1 hour of stirring, 4.14 grams (0.1380 mol) of a formaldehyde solution (19 wt %) was added drop wise at 60° C. A flocculate precipitate was formed and then dissolved. The theoretical solid content of 70% was adjusted with 4 grams of water. A 469.41 gram quantity of a moderately viscous, yellow, clear amine hardener was discharged.

Analytical Results:
Viscosity (25° C.): 4300 mPa*s
Amine number: 227 mg KOH/g
Solids: 70.2%
HEW: 211 g/equiv. HEW is calculated as the sum of all amine equivalents in the hardener divided by the total mass of ingredients of the hardener.

In the Examples, various standard analytical equipment and test methods are used including the following: viscosity is measured by ISO 3219-B; amine number is measured by ISO 9702; color is measure by ASTM D1544; refractive Index is measured by ASTM D1804; Shore D/A hardness is measured by ASTM D2240; pot life is measured by the gel time of a 100 g mixture according to DIN 16945; and surface appearance is measured by visual and/or haptic inspection. "Solids" are calculated as the total mass of hardener minus the mass of volatiles (i.e. water).

TABLE 1

Comparison of Comparative Example
A (POLYPOX W 804) vs. Example 1

|  | POLYPOX W 804 (Comparative Example A) | Example 1 (inventive) |
| --- | --- | --- |
| solid content [%] | 70 ± 1 | 70 ± 1 |
| HEW [g/equiv.] | 175 | 217 |
| viscosity [mPas] | 8000 ± 3000 | app. 4300 |

The pure binder systems (meaning the hardener of Comparative Example A or Example 1) with POLYPDX E 411 were also tested to show the difference between the common water based hardener and the flexible water based hardener. The formulations are shown in Tables 2 and 3, below. The binder system performance is shown in Table 4.

TABLE 2

Formulation with Example 1 Hardener

| | | supplier | | pbw |
|---|---|---|---|---|
| Component A | | | | |
| 1. | Example 1 hardener | | | 138 g |
| 2. | Water | | | 57 g |
| 3. | EFKA 2526 | EFKA | Defoamer | 5 g |
| 4. | Kronos 2063 | Kronos | Pigment | 29 g |
| 5. | Flammruβ 101 | Degussa | Pigment | 1 g |
| 6. | EWO | Alberti/Sachtleben | Barium sulfate | 300 g |
| 7. | ISG 100 | Dorfner | Quartz (0.06-0.25) | 450 g |
| 8. | Water | | | 30 g |
| 9. | Deuteron VT 819 (3% in water) | Deuteron | Thixotropic agent | 2 g |
| | | | Total Comp. A: | 1012 g |
| Component B | | | | |
| | POLYPOX E 411 | UPPC | | 125.5 g |

TABLE 3

Formulation with Comparative Example A hardener (POLYPOX W 804)

| | | supplier | | pbw |
|---|---|---|---|---|
| Component A | | | | |
| 1. | POLYPOX W 804 | UPPC | | 120 g |
| 2. | Water | | | 63 g |
| 3. | EFKA 2526 | EFKA | Defoamer | 5 g |
| 4. | Kronos 2063 | Kronos | Pigment | 29 g |
| 5. | Flammruβ 101 | Degussa | Pigment | 1 g |
| 6. | EWO | Alberti/Sachtleben | Barium sulfate | 300 g |
| 7. | ISG 100 | Dorfner | Quartz (0.06-0.25) | 450 g |
| 8. | Water | | | 30 g |
| 9. | Deuteron VT 819 (3% in water) | Deuteron | Thixotropic agent | 2 g |
| | | | Total Comp. A: | 1000 g |
| Component B | | | | |
| | POLYPOX E 411 | UPPC | | 140 g |

TABLE 4

Binder System Performance

| | Example 1 Hardener | Comparative Example A (POLYPOX W 804) |
|---|---|---|
| Formulation 1 with | | |
| resin | POLYPOX E 411 | POLYPOX E 411 |
| solid content Comp. A [%] | ~85 | ~85 |
| defoaming | ++ | ++ |
| surface | ++ | ++ |
| Shrinkage at the beginning [%] | 1.6 | 0.0 |
| Shrinkage after 7 d [%] | 0.20 | 0.17 |

TABLE 4-continued

Binder System Performance

| | Example 1 Hardener | Comparative Example A (POLYPOX W 804) |
|---|---|---|
| Shore-A at 23° C./50% rel. hum. | | |
| 16 h | 57 | 79 |
| 18 h | 63 | 80 |
| 24 h | 67 | 89 |
| 48 h | 77 | 96 |
| 7 d (Shore-D) | 54 | 80 |
| Shore-A at 13° C./80% rel. hum. | | |
| 16 h | n.d. | 74 |
| 18 h | 30 | 76 |
| 24 h | 39 | 85 |
| 48 h | 73 | 96 |
| 7 d | 86 (43 D) | 100 (74 D) |
| early water spot resistance 23° C./50% rel. hum. | ++ | ++ |
| early water spot resistance 13° C./80% rel. hum. | ++ | ++ |
| leveling | ++ | ++ |

+ = good;
− = bad

In the Examples, various standard analytical equipment and test methods are used including the following: viscosity is measured by ISO 3219-B; amine number is measured by ISO 9702; color is measure by ASTM D1544; refractive Index is measured by ASTM D1804; Shore D/A hardness is measured by ASTM D2240; pot life is measured by the gel time of a 100 g mixture according to DIN 16945; and surface appearance is measured by visual and/or haptic inspection. "Solids" are calculated as the total mass of hardener minus the mass of volatiles (i.e. water).

Shrinkage is measured on a 2 mm thick coating on polyethylene foil with a dimension of 5 cm×100 cm.

Early water spot resistance is inspected visually by putting a drop of water on the surface of the coating during the curing process.

Pendulum hardness was measured for the compositions and is shown in Table 5, below.

TABLE 5

Pure Binder System

| | Example 1 | Comparative Example A (POLYPOX W 804) |
|---|---|---|
| resin | POLYPOX E 411 | POLYPOX E 411 |
| solid content | 70.1% | 70% |
| solid content of the mixture | 65% | 65% |
| Pendulum hardness [Koenig] at 23° C./50% rel. hum. | | |
| 16 h | 8 | 36 |
| 18 h | 8 | 36 |
| 24 h | 8 | 51 |
| 48 h | 11 | 109 |
| 7 d | 21 | 179 |
| Pendulum hardness [Koenig] at 13° C./80% rel. hum. | | |
| 16 h | tack | 11 |
| 18 h | tack | 11 |
| 24 h | 8, tack | 23 |
| 48 h | 8 | 41 |
| 7 d | 17 | 78 |
| early water spot resistance 23° C./50% rel. hum. | ++ | + |

TABLE 5-continued

Pure Binder System

|  | Example 1 | Comparative Example A (POLYPOX W 804) |
|---|---|---|
| early water spot resistance 13° C./80% rel. hum. | ++ | + |
| surface | +/− | ++ |

+ = good;
− = bad

Both hardeners show clear films. The surface with hardener Example 1 is not as good as the surface with POLYPOX W 804.

The flexibility of coating is measurable and noticeable.

CONCLUSION

The starting formulation with Inventive hardener Example 1 shows more shrinkage and dishing than Comparative Example A, but the flexibility is measurable also in the binder system.

In conclusion, the inventive hardener can be used when flexible properties are required and a waterborne system is desired.

That which claimed is:

1. A hardener composition comprising:
   a) an aqueous solution of an isolated adduct;
   b) a capping agent; and
   c) a modifier consisting of benzyl alcohol;
   wherein said isolated adduct is a reaction product of: i) an aliphatic polymer with a functionality of at least three and containing at least one epoxy group; and ii) a polyamine;
   wherein at least one of said capping agent b) and said modifier c) is present in an amount of from 0.05 weight percent to 5 weight percent, based on the total weight of the hardener composition.

2. A hardener composition in accordance with claim 1 wherein said polyamine ii) is selected from the group consisting of ethylenediamine, diethylenetriamine, triethylenetetramine, m-xylylenediamine, methylpentamethylenediamine, 1,3-BAC and combinations thereof.

3. A hardener composition in accordance with claim 1 wherein said capping agent b) is selected from the group consisting of ethylene oxide, propylene oxide, butylene oxide, phenyl glycidyl ether, cresyl glycidyl ether, p.t-butylphenyl glycidyl ether, C12/C14 fatty alcohol glycidyl ether, and formaldehyde.

4. A hardener composition in accordance with claim 1 wherein said aliphatic polymer i) accounts for 30 weight percent to 95 weight percent of the isolated adduct, and said polyamine ii) accounts for 5 weight percent to 70 weight percent of the isolated adduct, based on the total weight of the isolated adduct.

5. A hardener composition in accordance with claim 1 wherein said isolated adduct is present in an amount of from 5 weight percent to 95 weight percent, based on the total weight of the hardener composition.

6. The hardener composition in accordance with claim 1, wherein said modifier c) is present in an amount of from 0.05 weight percent to 5 weight percent, based on the total weight of the hardener composition.

7. The hardener composition in accordance with claim 1, wherein said capping agent b) is present in an amount of from 0.05 weight percent to 5 weight percent, based on the total weight of the hardener composition.

8. A curable composition comprising:
   i) the hardener composition of claim 1; and
   ii) an epoxy resin selected from the group consisting of liquid bisphenol-A diglycidyl ethers, liquid bisphenol-F diglycidyl ethers, liquid epoxy novolacs, solid bisphenol-A epoxy resins, and combinations thereof.

9. A coating prepared from the composition of claim 8.

10. A primer prepared from the composition of claim 8.

11. A process for preparing the hardener composition of claim 1 comprising:
   contacting said aliphatic polymer i) and a molar excess of said polyamine ii) under reaction conditions to form an adduct;
   distilling excess polyamine to form said isolated adduct;
   adding water to form said aqueous solution of an isolated adduct a);
   admixing said aqueous solution of an isolated adduct a) with said capping agent b); and
   adding said modifier consisting of benzyl alcohol c);
   wherein at least one of said capping agent b) and said modifier c) is present in an amount of from 0.05 weight percent to 5 weight percent, based on the total weight of the hardener composition.

12. A process in accordance with claim 11 wherein said reaction conditions comprise a reaction temperature in the range of from 60° C. to 140° C.

* * * * *